DESIGN.
---
W. A. DUFF.
FLAG.
No. 7,178. Reissued June 13, 1876.
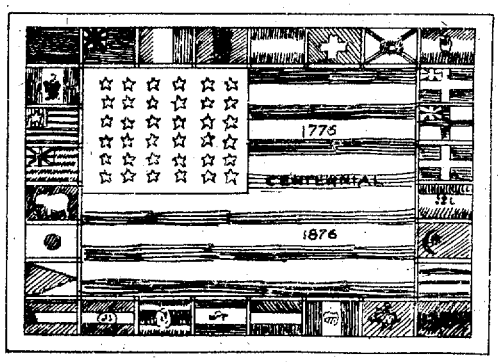
Witnesses:
Lewis F. Brous,
A. P. Grant.
Inventor:
Wm. A. Duff
by John N. Dickinson
Attorney.

UNITED STATES PATENT OFFICE.

WILLIAM A. DUFF, OF PHILADELPHIA, PENNSYLVANIA.

DESIGN FOR A FLAG.

Specification forming part of Design No. 8,873, dated December 28, 1875; Reissue No. 7,178, dated June 13, 1876; application filed May 4, 1876.

*To all whom it may concern:*

Be it known that I, WILLIAM A. DUFF, of the city and county of Philadelphia, and State of Pennsylvania, have originated a new and useful Design for a Flag, of which the following is a full, clear, and exact description, reference being had to the accompanying photographic illustration.

My design consists of a flag which is composed of the flags, in one, of several nations.

The flag of the United States of America may be the prominent feature of the design, and the flags of other nations may be grouped therewith, or they may be arranged as a border for the American flag.

The design is suggestive of the assembly of representatives of nations that have announced their intention of taking part, or will take part, in the one-hundredth anniversary of American Independence.

What I claim as my invention is—

The design for a flag composed of the flags, in one, of the United States of America, England, France, and other nations, substantially as above described.

WILLIAM A. DUFF.

Witnesses:

JOHN A. WIEDERSHEIM,
J. W. HAMPTON, Jr.